United States Patent
Israeli et al.

(10) Patent No.: US 10,241,845 B2
(45) Date of Patent: Mar. 26, 2019

(54) APPLICATION EVENT TRACING

(71) Applicant: HEWLETT PACKARD ENTERPRISE DEVELOPMENT LP, Houston, TX (US)

(72) Inventors: Aviad Israeli, Yehud (IL); Olga Shershevsky, Yehud (IL); Oded Gazit, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 47 days.

(21) Appl. No.: 15/507,404

(22) PCT Filed: Feb. 27, 2015

(86) PCT No.: PCT/US2015/017955
§ 371 (c)(1),
(2) Date: Feb. 28, 2017

(87) PCT Pub. No.: WO2016/137481
PCT Pub. Date: Sep. 1, 2016

(65) Prior Publication Data
US 2017/0286191 A1     Oct. 5, 2017

(51) Int. Cl.
*G06F 9/54*     (2006.01)
*G06F 11/36*     (2006.01)
(Continued)

(52) U.S. Cl.
CPC .......... *G06F 9/542* (2013.01); *G06F 11/3636* (2013.01); *H04L 43/0876* (2013.01); *H04L 67/16* (2013.01)

(58) Field of Classification Search
CPC ...... G06F 9/542; G06F 11/3636; H04L 67/16; H04L 43/0876
See application file for complete search history.

(56) References Cited

U.S. PATENT DOCUMENTS 7,739,282 B1 *   6/2010   Smith ..................... H04L 67/22
                                                                    707/661
7,765,295 B2     7/2010   Anastas et al.
(Continued)

FOREIGN PATENT DOCUMENTS

JP     2012133695 A     7/2012
JP     2012203522 A     10/2012
(Continued)

OTHER PUBLICATIONS

International Search Report & Written Opinion received in PCT Application No. PCT/US2015/017955, dated Nov. 19, 2015, 9 pages.
(Continued)

*Primary Examiner* — Charles E Anya

(57) ABSTRACT

Examples disclosed herein relate to a system for generating an element identifier comprising an action engine to identify at least one event listener associated with a significant event in an application, receive an action associated with an element of the application, generate a composite event sequence comprising a plurality of event listeners associated with the action, and determine whether the composite event sequence is associated with the at least one significant event. The system may further comprise a metric engine to measure a performance metric associated with the received action and create a log record according to the composite event sequence comprising the performance metric.

17 Claims, 4 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 8,095,650 B1 | 1/2012 | Cheng et al. | |
| 8,578,020 B2 | 11/2013 | Van Den Bogaert et al. | |
| 8,700,763 B2 | 4/2014 | Mackey | |
| 8,914,504 B2 | 12/2014 | Grelewicz et al. | |
| 9,733,716 B2* | 8/2017 | Shaffer | G06F 3/017 |
| 2005/0193277 A1 | 9/2005 | Horikawa et al. | |
| 2013/0185643 A1 | 7/2013 | Greifeneder et al. | |
| 2013/0222244 A1 | 8/2013 | Mak et al. | |
| 2014/0053021 A1 | 2/2014 | Schwartz et al. | |
| 2014/0136693 A1* | 5/2014 | Greifeneder | H04L 41/5067 709/224 |
| 2014/0327655 A1 | 11/2014 | Avrahami | |
| 2015/0146945 A1* | 5/2015 | Han | G06K 9/00033 382/125 |
| 2015/0220417 A1* | 8/2015 | Diment | G06F 11/3438 709/224 |
| 2016/0062562 A1* | 3/2016 | Ragothaman | G06F 3/0482 715/745 |

FOREIGN PATENT DOCUMENTS

| | | |
|---|---|---|
| JP | 2014229042 A | 12/2014 |
| WO | WO-2008109851 A2 | 9/2008 |

OTHER PUBLICATIONS

Zhang, L. et al., "Panappticon—Event-based Tracing to Measure Mobile Application and Platform Performance," (Research Paper), Sep. 29-Oct. 4, 2013, 10 pages, available at http://empathicsystems.org/Papers/codes13.pdf.

Pixley, Netscape Communications Corp., "Document Object Model Events", Nov. 13, 2000, 23 pages. <https://www.w3.org/TR/2000/REC-DOM-Level-2-Events-20001113/events.html#Events-overview>.

Wilson, "An Introduction to DOM Events", Smashing Magazine, Nov. 12, 2013, 22 pages. <https://www.smashingmagazine.com/2013/11/an-introduction-to-dom-events/>.

* cited by examiner

APPLICATION EVENT TRACING

BACKGROUND

A typical web-based and/or mobile application offers a number of ways to interact with users. For example, a user may select various elements on a web page, such as a search box, a list item, a link, an image, etc. In some cases, the creator of the application desires to measure the performance of the application in response to the user actions, such as by determining how long a given action takes to complete. Actions taken by the user may generate events that may be handled by different applications in different ways and developers may add action handlers to different events of a composite event sequence. For example, a user swiping a finger across a display on a touchscreen may generate a composite event sequence comprising events such as "touchstart", "touchmove", and "touchend" while the same action made with a mouse generates events such as "mousedown", "mousemove", and "mouseup". In such scenarios, the performance metrics for each action may be consolidated despite the differing underlying events.

BRIEF DESCRIPTION OF THE DRAWINGS

In the accompanying drawings, like numerals refer to like components or blocks. The following detailed description references the drawings, wherein.

DETAILED DESCRIPTION

As described above, a typical interface for a web application comprises numerous elements, such as images, links, menus, text descriptions, etc. These elements are often associated with event listeners that may be called by the application in response to actions, such as selections by an input device, tapping on a touchscreen, mouse movements, keyboard commands, etc. Accordingly, as described in detail below, various example implementations relate to tracing the events that occur on actions associated with the various elements, evaluating metrics associated with those actions, and logging the metrics for performance review and analysis.

In the description that follows, reference is made to the term, "machine-readable storage medium." As used herein, the term "machine-readable storage medium" refers to any electronic, magnetic, optical, or other physical storage device that stores executable instructions or other data (e.g., a hard disk drive, random access memory, flash memory, etc.).

Figure 1:
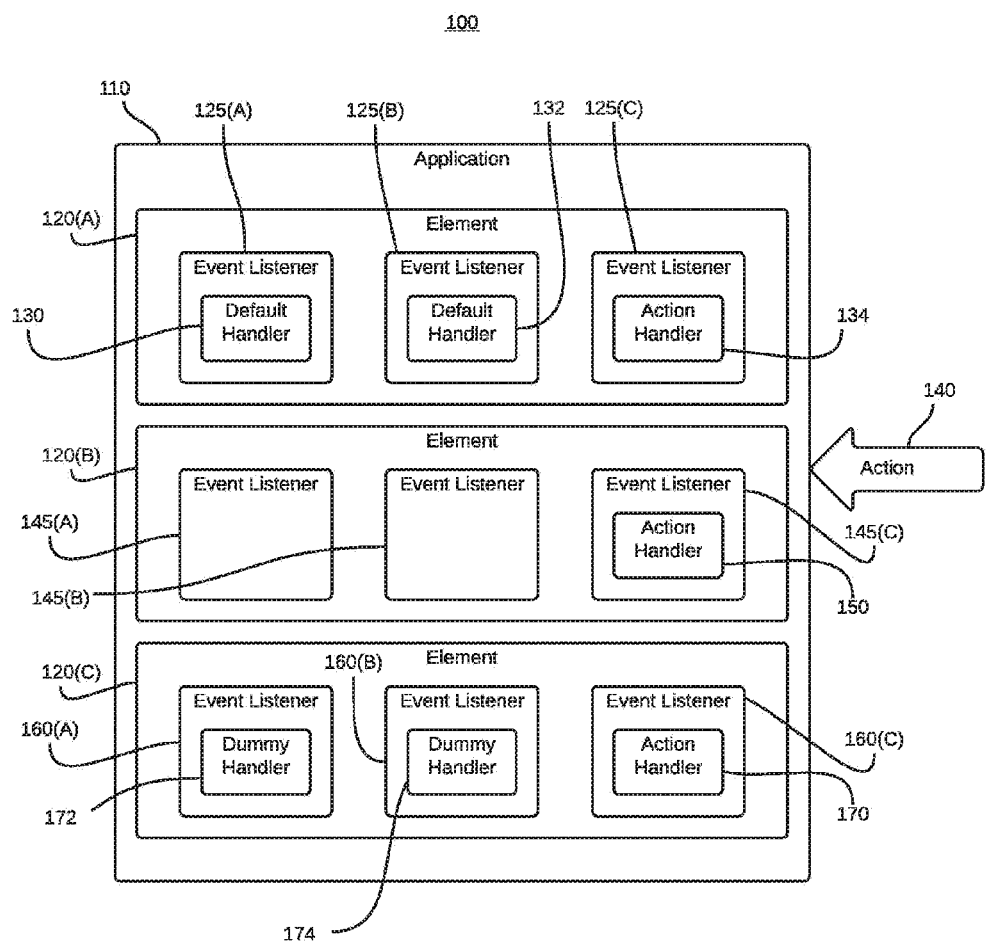
FIG. 1 is an example of an application consistent with disclosed implementations.

Referring now to the drawings, FIG. 1 is a block diagram of an embodiment of an application 100 consistent with disclosed implementations. Application 100 may comprise, for example, a web-based and/or mobile application, such as may be accessed from a user device such as a laptop computer, desktop computer, tablet, mobile phone, smartphone, game console, etc. Application 100 may be provided by a computing device such as a general and/or special purpose computer, server, mainframe, desktop, laptop, tablet, smart phone, game console, and/or any other system capable of providing computing capability consistent with providing the implementations described herein.

Application 100 may comprise a plurality of elements 120(A)-(C) such as text, images, hyperlinks, videos, menu buttons, forms, etc. Elements 120(A)-(C) may comprise user interface elements with which a user of application 100 may interact to perform tasks and/or commands on application 100. For example, elements 120(A)-(C) may comprise a checkbox elements associated with a form on a web page.

User actions such as an action 140 in application 100 may be translated into events that may be manipulated through code and/or scripts such as ASP, Java, JavaScript, Objective C, and various other programming languages. Whenever a user initiates an action (e.g. touch, swipe) on the user client, a sequence of events (e.g. touchstart, click, touchend) may be triggered so that event listeners in application 100 may process the action.

Each of elements 120(A)-(C) may comprise a plurality of event listeners. For example, element 120(A) may comprise a first event listener 125(A), a second event listener 125(B), and a third event listener 125(C). The event listeners may comprise programmatic hooks to allow user inputs, such as an action 140, to be passed from an operating environment to application 100.

Each event listener 125(A), 125(B), 125(C) may be called in response to a different action. For example, event listener 125(A) may be associated with a "touchstart" event that corresponds to a user action of touching element 120(A). Event listener 125(B) may be associated with a "touchmove" event that corresponds to a user action of dragging, scrolling and/or swiping on element 120(A). Event listener 125(C) may be associated with a "touchend" event that corresponds to a user action of lifting away from element 120(A) (e.g., lifting their finger, stylus, mouse pointer, etc.).

Each event listener 125(A), 125(B), 125(C) may comprise a handler. For example, event listener 125(A) may comprise a first default action handler 130, event listener 125(B) may comprise a second default action handler 132, and event listener 125(C) may comprise a non-default action handler 134. Default action handlers may be provided by an operating environment for application 100. In some implementations, a web browser hosting application 100 as a web-based application may provide default action handlers (e.g., the default behaviors of the web browser) for various user actions when a developer of application 100 has not overridden those action handlers. For example, default action handler 132 may handle a swipe action by a user by highlighting text. In some implementations, an event listener may be associated with a plurality of action handlers. For example, the event listener may be associated with a default action handler (e.g., default behavior provided by a web-browser for a web-based application), a dummy handler added to aid in application event tracing, and a developer-added action handler to provide functionality to the application.

Action handler 134 may comprise a non-default action handler associated with functionality defined by the developer of application 100. For example, element 120(A) may comprise a menu command in application 100; a "touchend" event associated with element 120(A) may cause event listener 125(C) to call action handler 134 instead of a default action handler for that event. Action handler 134 may, for example, comprise functionality to be performed in response to a user selection of the menu command associated with element 120(A) instead of default functionality associated with a "touchend" event.

In some implementations, event listener 125(C) may comprise a significant event based on the association with a non-default action handler such as action handler 134. Event listeners 125(A)-(B) may comprise non-significant events based on the association with a default action handler. Event listeners 125(A)-(C) may be registered with application 100 to be called in response to actions associated with their events.

In some implementations, event listeners may not be associated with any handler, default or non-default. For example, element 120(B) may comprise a second plurality of event listeners 145(A)-(C). Event listeners 145(A)-(B) may not be associated with an action handler as no functionality needs to be performed when their respective events occur due to the implementation of application 100. Action handler 150 may comprise a non-default action handler for event listener 145(C), however, and so event listener 145(C) may register with application 100 to be called in response to actions associated with its event (e.g., "touchend").

As described above, different elements may be implemented in different ways within application 100. This may result in different event listeners being called for different actions, even when the actions are similar. For example, a swipe action by a user on element 120(A) may result in the event listeners "touchstart", "touchmove", "touchcancel", "touchend" being called by application 100 while the same action on element 120(B) results only in an event listener for "touchend" being called.

In some implementations, adding a dummy action handler to each event listener associated with an element may result in the same sequence of event listeners being called for some and/or all actions. For example, element 120(C) may comprise a third plurality of event listeners 160(A)-(C). As with elements 120(A)-(B), only one of the event listeners comprises a non-default action handler; action handler 170 of event listener 160(C) in this example. A first dummy action handler 172 and a second dummy action handler 174 may be associated with event listener 160(A) and event listener 160(B), respectively. Dummy action handlers 172, 174 may result in event listeners 160(A)-(B) being called when a user action such as action 140 is performed on element 120(C). Each user action associated with element 120(C) may thus result in the same event sequence regardless of which event listener is actually associated the user action. For example, both a swipe and a tap action may result in the event sequence "touchstart", "touchmove", "touchcancel", "touchend" being generated for the action, even when the swipe action may normally be directed to an event listener for the "touchmove" event and the tap action may normally be directed to an event listener for the "touchend" event.

Insertion of dummy event handlers 172, 174 may be performed during the loading of application 100 by injecting code (e.g., javascript, .NET, etc.) into application 100. The injection may ensure that the dummy action handler code may be executed before the logic for application 100 such that any event handler that is defined by application 100 may go through the injected code.

The dummy action handlers may be added for predefined events (e.g., 'click', 'mousedown', 'touchstart', 'touchmove', 'touchend', 'touchcancel', 'mouseup', 'load', 'keydown', 'keyup'). Each user action may then result in the same full sequence of events, some comprising dummy action handlers and some comprising significant (e.g., application and/or business logic) action handlers.

Each user action, such as action 140, may result in a composite event sequence object being created each time an initial event (e.g., "touchstart" and/or "mousedown") is triggered. Subsequent events may be associated to the current event sequence until the event sequence is closed. Event sequences may be closed by the expiration of an idle timer (e.g., no new events are received for a configurable amount of time, such as 500 ms) and/or when a new event sequence event type (e.g., "touchstart" and/or "mousedown") is triggered.

In some implementations, application 100 may monitor the user experience by measuring performance metrics associated with the performance of action 140. Performance metrics may comprises data such as an amount of time taken to complete an action, an amount of resources used to perform the action, a number, if any, of errors and/or exceptions generated by the action, etc. The performance metrics may then be associated with the composite event sequence for logging purposes.

Figure 2:
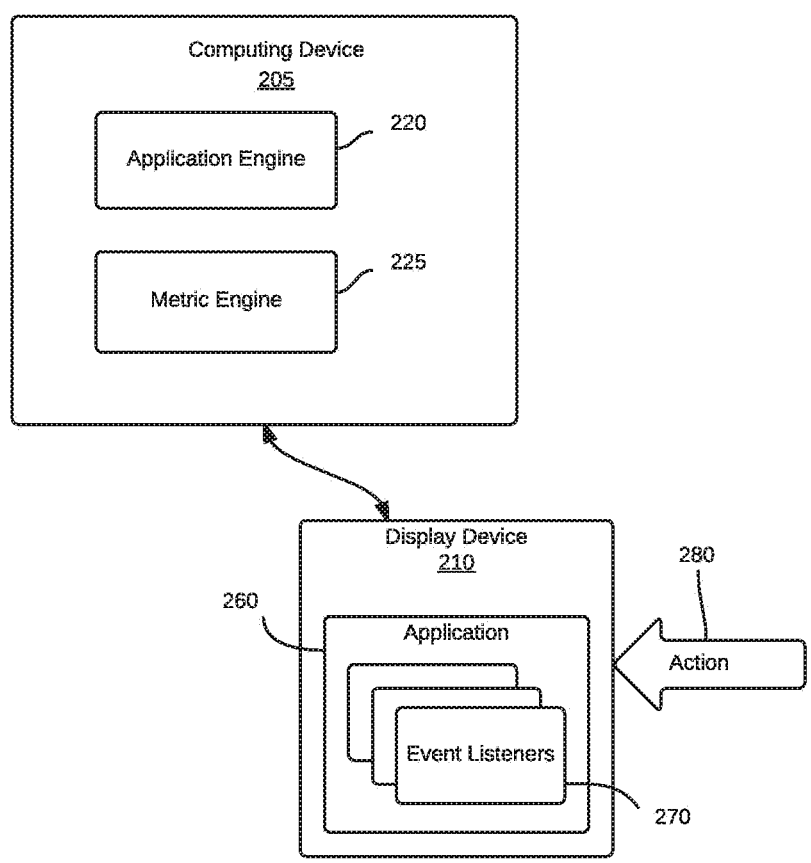
FIG. 2 is a block diagram of a system for application event tracing consistent with disclosed implementations.

FIG. 2 is a block diagram of a system 200 for application event tracing consistent with disclosed implementations. System 200 may comprise a computing device 205 and a display device 210. Computing device 205 may comprise, for example, a general and/or special purpose computer, server, mainframe, desktop, laptop, tablet, smart phone, game console, and/or any other system capable of providing computing capability consistent with providing the implementations described herein. Display device 210 may comprise, for example, a cathode ray tube (CRT) monitor, a liquid crystal display (LCD) screen, a touchscreen, or a screen implemented using another display technology. It should be apparent, however, that any suitable display may be used. The display device may be internal or external to computing device 205 depending on the configuration of system 200.

Computing device 205 may comprise an application engine 220 and a metric engine 225. Application engine 220 and metric engine 225 may each comprise, for example, instructions stored a machine readable medium executable by a processor, logic circuitry, or combinations thereof.

Display device 210 may display an application 260 comprising a plurality of event listeners 270. In some implementations, an action 280 may be received by application 260 associated with an interaction between a user and an interface of application 260 on display device 210. Such an interface may comprise a plurality of elements, such as those described above with respect to FIG. 1.

Application engine 220 may identify at least one of event listeners 270 associated with a significant event in application 210, receive action 280 associated with an element of application 210, generate a composite event sequence comprising plurality of event listeners 270 associated with the action, and determine whether the composite event sequence is associated with the at least one significant event.

In some implementations, a web-based application may present several selectable elements to a user via display device 210. A user may interact with those elements using a mouse, stylus, finger, keyboard and/or other input. For example, the user may swipe across one of the elements, triggering "touchstart", "touchmove", and "touchend" events, each of which may be associated with event listeners 270. Action engine 220 may determine whether any of the triggered events comprises a significant event, which may comprise determining whether a non-default action handler has been added to the event listener for that event.

Metric engine 225 may, in response to application engine 220 determining that the composite event sequence is associated with the at least one significant event, measure a performance metric associated with the received action and create a log record according to the composite event sequence comprising the performance metric. For example, metric engine 225 may measure an amount of time taken to complete the action and output the result to display device 210.

In some implementations, application engine 220 may generate the composite event sequence based on an initial event. For example, "touchstart" and/or "mousedown" events may be configured as initial events in a sequence. Other events, which may differ in different applications and implementations, may also comprise initial events. Each instance of the initial event may signal application engine 220 to begin a new composite event sequence.

In some implementations, application engine 220 may generate the composite event sequence based on an end event. For example, a "touchend" and/or "mouseup" event may be configured as end events in the sequence. Such events may comprise the last events associated with a typical event sequence for a user action and so may be used to signal the closing of the composite event sequence.

In some implementations, application engine 220 may generate the composite event sequence based on an expiration of an idle timer. For example, if a period of time (e.g., 500 ms) passes without any new events being triggered, application engine 220 may close the event sequence such that subsequently triggered events may be associated with a new composite event sequence.

In some implementations, application engine 220 may add a dummy action handler to an event listener associated with at least one non-significant event. For example, some of event listeners 270 may be associated with default action handlers and/or no action handler at all. Such event listeners may comprise non-significant event listeners, while event listeners whose action handler has been overridden with functional logic by a developer of application 260 may be associated with significant event listeners. Significant event listeners may comprise those event listeners for which the developer is interested in measuring performance metrics.

The composite event sequence may comprise a significant event listener and at least one non-significant event listener. The dummy handlers added to each of the non-significant event listeners may cause those event listeners to be called by application 260 each time a user action, such as action 280, is received. Without the dummy action handlers, the event listeners may be skipped, resulting in a different event sequence each time.

Although one computing device 205 and one display device 210 are depicted in FIG. 2, certain implementations of system 200 may comprise more than one computing device 205 and one display device 210. At least one of the computing devices may be employed and arranged, for example, in at least one server bank, computer bank, data center, and/or other arrangements. For example, the computing devices together may include a cloud computing resource, a grid computing resource, and/or any other distributed computing arrangement. Such computing devices may be located in a single installation and/or may be distributed among many different geographical locations.

Figure 3:
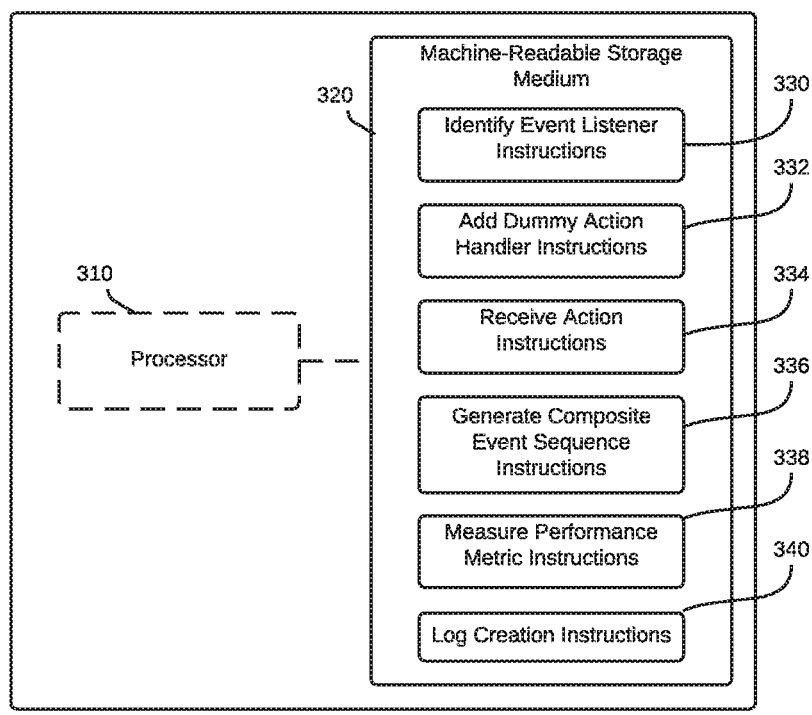
FIG. 3 is a block diagram of an example application event tracing device consistent with disclosed implementations.

FIG. 3 is a block diagram of an example application event tracing device 300 consistent with disclosed implementations. Application event tracing device 300 may comprise a processor 310 and a non-transitory machine-readable storage medium 320. Application event tracing device 300 may comprise a computing device such as a desktop computer, a laptop computer, a handheld computing device, a mobile phone, or the like. Processor 310 may be a central processing unit (CPU), a semiconductor-based microprocessor, or any other hardware device suitable for retrieval and execution of instructions stored in machine-readable storage medium 320. In particular, processor 310 may fetch, decode, and execute a plurality of identify event listener instructions 330, add dummy action handler instructions 332, receive action instructions 334, generate composite event sequence instructions 336, measure performance metric instructions 338, and log creation instructions 340 to implement the functionality described in detail below.

Executable instructions such as identify event listener instructions 330, add dummy action handler instructions 332, receive action instructions 334, generate composite event sequence instructions 336, measure performance metric instructions 338, and log creation instructions 340 may be stored in any portion and/or component of machine-readable storage medium 320. The machine-readable storage medium 320 may comprise both volatile and/or non-volatile memory and data storage components. Volatile components are those that do not retain data values upon loss of power. Nonvolatile components are those that retain data upon a loss of power.

The machine-readable storage medium 320 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Machine-readable storage medium 320 may be encoded with executable instructions for displaying a user interface that enables a user to interact with applications, such as application 100. Executable instructions may comprise, for example, at least a portion of an operating system (OS) of application event tracing device 300 or a separate application running on top of the OS to present a user interface. As another example, the executable instructions may be included in a web browser, such that the web browser implements the interface described in detail herein. In some embodiments, the executable instructions may be implemented in web-based script interpretable by a web browser, such as JavaScript.

More specifically, machine-readable storage medium 320 may be encoded with identify event listener instructions 330 to identify a first event listener of a plurality of event listeners as a significant event listener associated with an application. For example, application 100 may comprise a plurality of elements for which event listeners are available but for which only some have had action handlers registered. Event listeners such as "touchstart", "touchmove" and "touchend" may be available for a given element of application 100, but only "touchstart" may have been registered with a non-default (i.e., application developer defined) action handler. Because the action handler may comprise an override of a default application function, the event listener for the "touchstart" event for the element may thus be identified as a significant event listener.

Machine-readable storage medium 320 may be further encoded with add dummy action handler instructions 332 to add a dummy action handler to a second listener of the plurality of event listeners wherein the second event listener of the plurality of event listeners comprises a non-significant event listener. Non-significant event listeners may comprise those event listeners associated with elements of application 100 that comprise no action handler and/or a default action handler. For example, a dummy action handler may be added to an event listener that simply exits without performing functionality, performs a minor operation and discards the result, and/or calls another event listener. Adding the dummy action handler to the event listeners may cause those event listeners to be registered with the application. Thus, calls to those event listeners may be made when the events associated with the event listeners are triggered by user actions.

Machine-readable storage medium 320 may be further encoded with receive action instructions 334 to receive an action associated with the first event listener. Action 140 may be received by application 100 in response to a user interaction with an interface of application 100. For example, a user may perform a swipe action across one of elements 120(A)-(C). Application 100 may interpret the user's swipe action as "touchstart", "touchmove", and "touchend" events and call the event listeners associated with those events that have registered as having an action handler to process those events.

Machine-readable storage medium 320 may be further encoded with generate composite event sequence instructions 336 to generate a composite event sequence comprising the first event listener and the second event listener. For example, the composite event sequence may comprise a data structure comprising an ordered list of each of the event listeners called by triggered events in response to action 140. In the example above, the composite event sequence associated with a user's swipe action may comprise the events "touchstart", "touchmove", and "touchend".

Machine-readable storage medium 320 may be further encoded with measure performance metric instructions 338 to measure a performance metric associated with the action. For example, the measured performance metric associated with the action may comprise an amount of time taken to complete the action.

Machine-readable storage medium 320 may be further encoded with log creation instructions 340 to create a log record comprising the performance metric. In some implementations, the log record may be associated with the composite event sequence. For example, a log record may be submitted to a log database for aggregation with other measured metrics. In some implementations, log creation instructions 340 may generate a performance report associated with the application, wherein the performance report consolidates a plurality of log records each associated with the composite event sequence.

In some implementations, device 300 may receive a second action associated with the second event listener of the plurality of event listeners, generate the composite event sequence comprising the first event listener and the second event listener, measure a second performance metric associated with the second action, create a second log record associated with the composite event sequence comprising the second performance metric, wherein the second log record, and associate the second log record to the log record associated with the composite event sequence. Because the dummy action handlers have been added to each of the non-significant event listeners, each of those associated events will be triggered and added to the composite event sequence. This enables different actions on the same element to be aggregated according to uniform composite event sequences.

Figure 4:
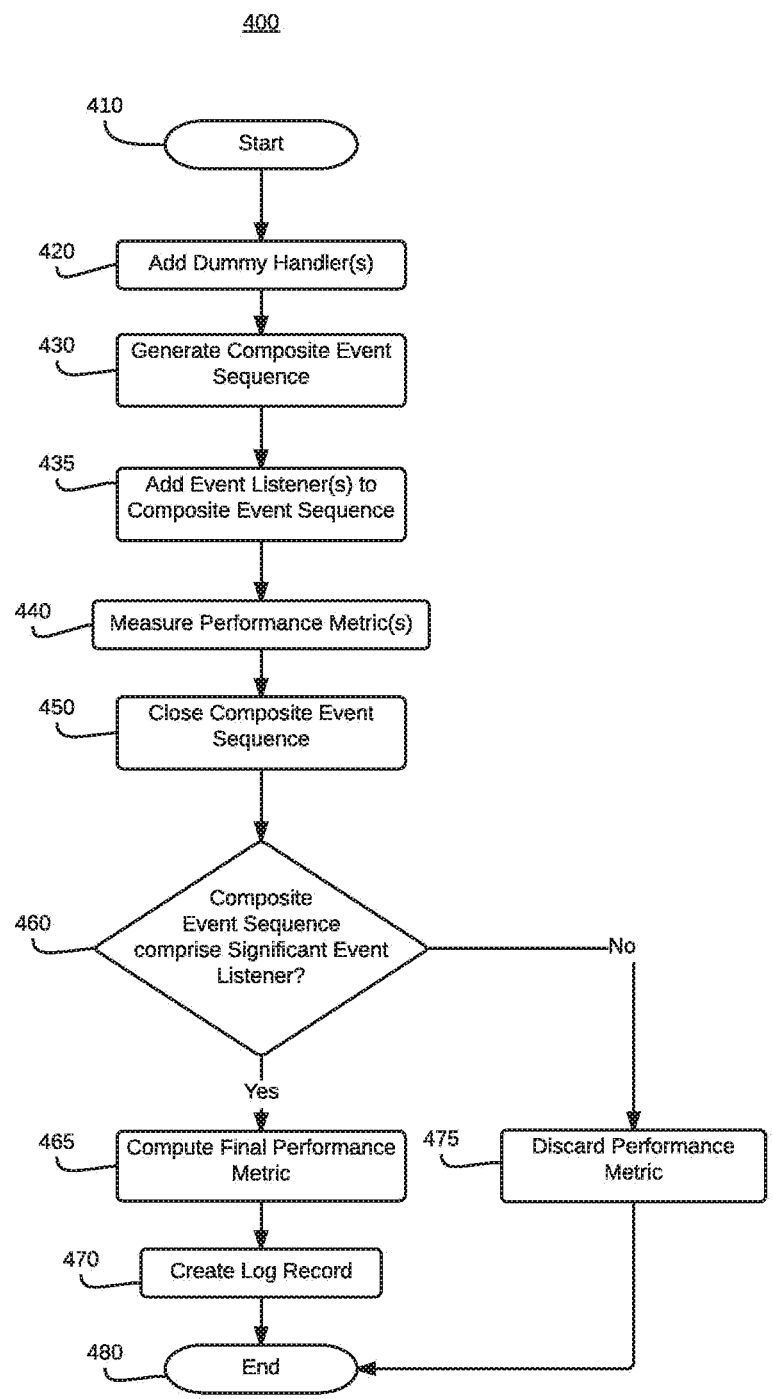
FIG. 4 is a flowchart of an embodiment of a method for application event tracing consistent with disclosed implementations.

FIG. 4 is a flowchart of an embodiment of a method 400 for application event tracing consistent with disclosed implementations. Although execution of method 400 is described below with reference to the components of system 200, other suitable components for execution of method 400 may be used. Method 400 may be implemented in the form of executable instructions stored on a machine-readable storage medium, such as machine-readable storage medium 320 of device 300.

Method 400 may start in block 410 and proceed to block 420 where system 200 may add a dummy action handler to each of a plurality of event listeners associated with an application. Each of the plurality of event listeners may comprises a non-default action handler and/or be associated with a default behavior of the application's operating environment (e.g., a web browser). For example, a dummy action handler may be added to an event listener that simply exits without performing functionality, performs a minor operation and discards the result, and/or calls another event listener. Adding the dummy action handler to the event listeners may cause those event listeners to be registered with the application. Thus, calls to those event listeners may be made when the events associated with the event listeners are triggered by user actions.

Method 400 may then advance to block 430 where system 200 may generate a composite event sequence comprising at least one first event listener in response to receiving a first user action associated with the application. For example, action 140 may be received by application 100 in response to a user interaction with an interface of application 100. For example, a user may perform a swipe action across one of elements 120(A)-(C). Application 100 may interpret the user's swipe action as "touchstart", "touchmove", and "touchend" events and call the event listeners associated with those events that have registered as having an action handler to process those events. One of these events may comprise a predefined start event (e.g. "touchstart" and/or "mousedown") that may be associated with the start of several different user actions. The composite event sequence may comprise a data structure comprising an ordered list of each of the event listeners called by triggered events in response to action 140.

Method 400 may then advance to block 435 where system 200 may add at least one second event listener of the plurality of event listeners to the composite event sequence based on the dummy action handler of the at least one second event listener. For example, the composite event sequence generated at block 430 may comprise the predefined start event "touchstart"; the next event listener "touchmove" may then be added to the composite event sequence when the dummy action handler added at block 420 is called by application 100.

Method 400 may then advance to block 440 where system 200 may measure a respective performance metric for the at least one first event listener and the at least one second event listener. In some embodiments, the respective performance metrics may comprise a time to complete the action handler(s) associated with each of the event listeners in the composite event sequence. the at least one first event listener and the at least one second event listener For another example, the measured performance metric associated with the event listener(s) may comprise an amount of resources consumed (e.g., processing time, data storage, etc.) by performing the action handler(s).

Method 400 may then advance to block 450 where system 200 may close the composite event sequence. For example, system 200 may close the composite event sequence in response to an expiration of an idle timer in which no new events are triggered. In some implementations, system 200 may close the composite event sequence in response to receiving of a second user action triggering the at least one predefined start event. For example, if another "touchstart" event is triggered, system 200 may close the composite event sequence and generate a new composite event sequence.

Method 400 may then advance to block 460 where system 200 may determine whether the composite event sequence comprises a significant event listener. For example, system 200 may identify a significant event listener of application 100 by determining whether the event listener comprises comprises a non-default and non-dummy action handler (i.e., an application developer defined action handler).

In response to determining that the composite event sequence comprises the significant event listener, method 400 may advance to block 465 where system 200 may computing a final performance metric for the user action. For example, system 200 may compute a total time to complete the user action according to the respective performance metrics for each of the event listeners in the composite event sequence.

Method 400 may then advance to block 470 where system 200 may create a log record comprising the final performance metric, wherein the log record is associated with the first composite event sequence. For example, a log record comprising an identifier for the action, the composite event sequence, a time of the action, the measured performance metric, and/or additional data may be submitted to a log database for aggregation with other measured metrics. Because the dummy action handlers have been added to each of the non-significant event listeners, each of those associated events may be triggered and added to the composite event sequence. This enables different actions on the same element to be aggregated according to uniform composite event sequences.

If, at stage 460, system 200 determines that that the composite event sequence does not comprise the significant event listener, method 400 may advance to stage 475 where system 200 may discard the respective performance metrics. For example, a composite event sequence for which a user action does not trigger a significant event listener may be discarded along with their respective performance metrics without creating a log record. Method 400 may then end at block 480.

The disclosed examples may include systems, devices, computer-readable storage media, and methods for progressive buffer generation. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with FIGS. 1-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A system for application event tracing comprising:
a processor; and
a memory storing instructions that when executed cause the processor to:
identify a first event listener associated with a significant event in an application,
insert a dummy action handler to a second event listener associated with the application to cause the second event listener to be called by the application when an action associated with the first event listener is received,
receive the action associated with the first event listener,
in response to receiving the action associated with the first listener, generate a composite event sequence comprising the first and second event listeners associated with the action, and
determine whether the composite event sequence comprises the first event listener associated with the significant event; and
in response to determining that the composite event sequence comprises the first event listener associated with the significant event:
measure a performance metric associated with the action, and
create a log record according to the composite event sequence, the log record comprising the performance metric.

2. The system of claim 1, wherein the processor is to identify that the first event listener is associated with the significant event based on whether the first event listener includes a non-default action handler.

3. The system of claim 1, wherein the processor is to generate the composite event sequence based on an initial event of the action.

4. The system of claim 3, wherein the processor is to generate the composite event sequence further based on an end event of the action.

5. The system of claim 3, wherein the processor is to generate the composite event sequence further based on an expiration of an idle timer.

6. The system of claim 1, wherein the processor is to add the dummy action handler to the second event listener after identifying that the second event listener is associated with a non-significant event.

7. The system of claim 6, wherein the processor is to identify that the second event listen is associated with the non-significant event based on a determination that the second listener includes a default action handler.

8. The system of claim 1, wherein the action associated with the element of the application comprises an interaction between a user and an interface of the application on a display device.

9. A non-transitory machine-readable storage medium including instructions which, when executed by a processor, cause the processor to:
identify a first event listener of a plurality of event listeners as a significant event listener associated with an application;
add a dummy action handler to a second event listener of the plurality of event listeners to cause the second event listener to be called by the application when an action associated with the first event listener is received, wherein the second event listener of the plurality of event listeners is a non-significant event listener;
receive the action associated with the first event listener;
in response to receiving the action associated with the first event listener, generate a composite event sequence comprising the first event listener and the second event listener;
measure a performance metric associated with the action; and
create a log record comprising the performance metric, wherein the log record is associated with the composite event sequence.

10. The non-transitory machine-readable storage medium of claim 9, wherein the measured performance metric associated with the action comprises an amount of time taken to complete the action.

11. The non-transitory machine-readable storage medium of claim 9, wherein the instructions to identify the first event listener as the significant event listener associated with the application comprise instructions to determine whether each of the plurality of event listeners comprises a non-default action handler.

12. The non-transitory machine-readable storage medium of claim 11, wherein the non-default action handler comprises an application function override of a default action handler.

13. The non-transitory machine-readable storage medium of claim 9, further comprising instructions to:
receive a second action associated with the second event listener of the plurality of event listeners;
measure a second performance metric associated with the second action,
create a second log record associated with the composite event sequence comprising the second performance metric; and
associate the second log record to the log record associated with the composite event sequence.

14. The non-transitory machine-readable storage medium of claim 9, further comprising instructions to generate a performance report associated with the application, wherein the performance report consolidates a plurality of log records each associated with the composite event sequence.

15. A computer-implemented method comprising:
identifying, by a processor, a first event listener of a plurality of event listeners associated with an application;
adding, by the processor, a dummy action handler to a second event listener of a plurality of event listeners associated with the application to cause the second event listener to be called by the application when an action associated with the first event listener is received;
receiving a first user action associated with the first event listener;
generating, by the processor, a composite event sequence comprising the first event listener in response to receiving the first user action associated with the first event listener, wherein the first user action triggers a predefined start event;
adding the second event listener of the plurality of event listeners to the composite event sequence based on the dummy action handler of the second event listener;
measuring a respective performance metric for the first event listener and the second event listener, wherein the respective performance metric comprises a time to complete the first event listener and the second event listener; and
creating, by the processor, a log record comprising the respective performance metric, wherein the log record is associated with the composite event sequence.

16. The method of claim 15, further comprising:
closing the composite event sequence in response to one of the following: an expiration of an idle timer and a receiving of a second user action triggering the predefined start event.

17. The method of claim 15, further comprising:
determining whether the composite event sequence comprises a significant event listener, wherein the significant event listener comprises a non-default and non-dummy action handler;
in response to determining that the composite event sequence comprises the significant event listener, computing a final performance metric comprising a total time to complete the user action based on the respective performance metrics for the first event listener and the second event listener, and adding the final performance metric to the log record associated with the composite event sequence; and
in response to determining that the composite event sequence does not comprise the significant event listener, discarding the respective performance metrics.

* * * * *